United States Patent [19]
Blumenstock et al.

[11] Patent Number: 5,255,515
[45] Date of Patent: Oct. 26, 1993

[54] METHOD AND ARRANGEMENT FOR OBTAINING AN EVALUATION VALUE FOR THE PERFORMANCE LOSS OF A CATALYTIC CONVERTER

[75] Inventors: Andreas Blumenstock, Ludwigsburg; Ernst Wild, Oberriexingen; Helmut Denz, Stuttgart; Klaus Ries-Müller, Bad Rappenau, all of Fed. Rep. of Germany

[73] Assignee: Robert Bosch GmbH, Stuttgart, Fed. Rep. of Germany

[21] Appl. No.: 981,844

[22] Filed: Nov. 25, 1992

[30] Foreign Application Priority Data

Nov. 30, 1991 [DE] Fed. Rep. of Germany ....... 4139560

[51] Int. Cl.$^5$ ............................................. F07N 3/20
[52] U.S. Cl. ...................................... 60/274; 60/276; 60/277
[58] Field of Search ..................... 60/274, 276, 277; 123/691

[56] References Cited

U.S. PATENT DOCUMENTS 3,962,866 6/1976 Neidhard et al. ..................... 60/276

Primary Examiner—Noah P. Kamen
Attorney, Agent, or Firm—Walter Ottesen

[57] ABSTRACT

The invention is directed to a method for obtaining a value for evaluating the performance loss of a catalytic converter with the aid of a forward signal of a forward gas probe mounted forward of the catalytic converter and a rearward signal of a rearward gas probe mounted rearward of the catalytic converter, the catalytic converter being connected to an internal combustion engine. The method includes the steps of: carrying out the method during the steady-state operation of the engine; multiplying the forward signal and the rearward signal with each other to form a plurality of products; averaging the products over a plurality of oscillations of the forward signal to obtain a mean value; and, utilizing the mean value as a value for evaluating the performance loss of the catalytic converter. This correlation method can be varied in different ways and especially in that the forward-probe signal is correlated without or with phase shift with the rearward-probe signal. A cross-correlation factor or the real or imaginary component of an orthogonal correlation or other correlation values are obtained in dependence upon the nature of the correlation. These correlation values are used for evaluating the performance loss of the catalytic converter. The evaluation of the performance loss of the catalytic converter with the aid of these correlation values is very significantly more reliable than the evaluation with the aid of amplitudes or amplitude mean values of the probe signals.

10 Claims, 3 Drawing Sheets

METHOD AND ARRANGEMENT FOR OBTAINING AN EVALUATION VALUE FOR THE PERFORMANCE LOSS OF A CATALYTIC CONVERTER

FIELD OF THE INVENTION

The invention relates to a method and an arrangement for obtaining a value for evaluating the performance loss of a catalytic converter connected to an internal combustion engine.

BACKGROUND OF THE INVENTION

U.S. Pat. No. 3,962,866 discloses a two-level lambda-control method wherein the difference between the signals of a probe forward of the catalytic converter and of a probe rearward of the catalytic converter is formed as a value for evaluating the performance loss of the converter. The poorer the conversion of the converter, the greater is the amplitude of the signal of the rearward probe. For this reason, the small difference between the signals from the two probes becomes ever smaller with increasing performance loss of the converter. A warning signal is emitted when this value drops below a threshold value. In order that the investigated value is not too dependent upon the operating point at which the engine is operated, it is advantageous to determine this value only during steady-state operation of the engine.

The probes used in the method just described and in the arrangement corresponding thereto are oxygen probes. In the entire further description, the assumption is made that such probes are used forward and rearward of the catalytic converter. However, any other probe can be utilized which is in the position to indicate the quantity of one component or several components in the exhaust gas of the internal combustion engine.

It has been established that the method described above and the arrangement corresponding thereto are very susceptible to disturbances and therefore permit only a coarse evaluation of the performance loss of the catalytic converter.

SUMMARY OF THE INVENTION

In view of the foregoing, it is an object of the invention to provide a method and an arrangement for obtaining a reliable evaluation value for the performance loss of a catalytic converter.

The method of the invention is for obtaining a value for evaluating the performance loss of a catalytic converter with the aid of a forward signal of a forward gas probe mounted forward of the catalytic converter and a rearward signal of a rearward gas probe mounted rearward of the catalytic converter, the catalytic converter being connected to an internal combustion engine and the method including the steps of: carrying out the method during the steady-state operation of the engine; multiplying the forward signal and the rearward signal with each other to form a plurality of products; averaging the products over a plurality of oscillations of the forward signal to obtain a mean value; and, utilizing the mean value as a value for evaluating the performance loss of the catalytic converter.

In the foregoing, the signals of the probes forward and rearward of the converter can be multiplied by each other with or without phase shift. If multiplication takes place without phase shift, then a variable is obtained which corresponds to the real component of the output variable for orthogonal correlation. However, if the forward probe signal is shifted rearwardly by one-quarter of its period duration in advance of the multiplication, then a variable is obtained which corresponds to the imaginary component of the output variable for orthogonal correlation. If the forward probe signal is shifted rearwardly by the phase shift between forward and rearward probe signals in advance of the product formation, then the maximum cross-correlation factor is obtained. All these values are useable directly to evaluate the performance loss of the catalytic converter. However, these values can also be logically combined, especially the above-mentioned real and imaginary components, and only the value of the combined variable is utilized for evaluating the performance loss.

Especially when the computation of the orthogonal correlation with the conversion of the real and imaginary components into an amplitude and/or phase is used, then it is advantageous to undertake the mean-value formation only in such time duration in which the rearward probe signal deviates from the air ratio one. The nature of the computation is then closer to the actual orthogonal correlation for which an output signal of a signal-influencing path is assumed which continuously is in a fixed phase and amplitude relationship to the input signal for a fixed frequency in each case.

The object of the invention is reached when the above-mentioned values are obtained. The value determined in each case can be compared to a threshold value in a conventional manner. It is then advantageous to carry out the comparison with a particular threshold value which is dependent upon the current steady-state operating condition of the engine. Such values can initially be read into a characteristic field from which they can be read out for the comparison in dependence upon the particular operating condition present.

Experiments have shown that the values obtained with the method of the invention are hardly subject to disturbances in comparison to the method referred to initially. Accordingly, an evaluation can be made with a greater reliability than heretofore as to whether a catalytic converter can still be used.

The arrangement of the invention includes a forward and a rearward gas probe and an operating condition detection device as well as a computation unit which is so configured that it can undertake the above-mentioned product formation and the above-mentioned follow-on averaging.

According to another embodiment of the arrangement, this arrangement includes a characteristic field for storing extreme values for the evaluation variable and an evaluation unit for comparing the evaluation value emitted by the computation unit with a value read out of the characteristic field.

With the arrangement according to the invention, a value for evaluating the performance loss of a catalytic converter can be computed very reliably. With the further embodiment of the arrangement of the invention, it is in addition possible to compare such a quite precisely computed value to a threshold value and, with this comparison, to evaluate whether the catalytic converter can still be used.

BRIEF DESCRIPTION OF THE DRAWINGS

The invention will now be described with reference to the drawings wherein:

FIGS. 2a to 2c show time-correlated diagrams wherein FIG. 2a shows a forward-probe signal and FIG. 2b shows a rearward-probe signal for the case where the catalytic converter has only slight performance loss while, in FIG. 2c, a rearward-probe signal is shown for a catalytic converter which has a high performance loss;

DESCRIPTION OF THE PREFERRED EMBODIMENTS OF THE INVENTION

Figure 1:
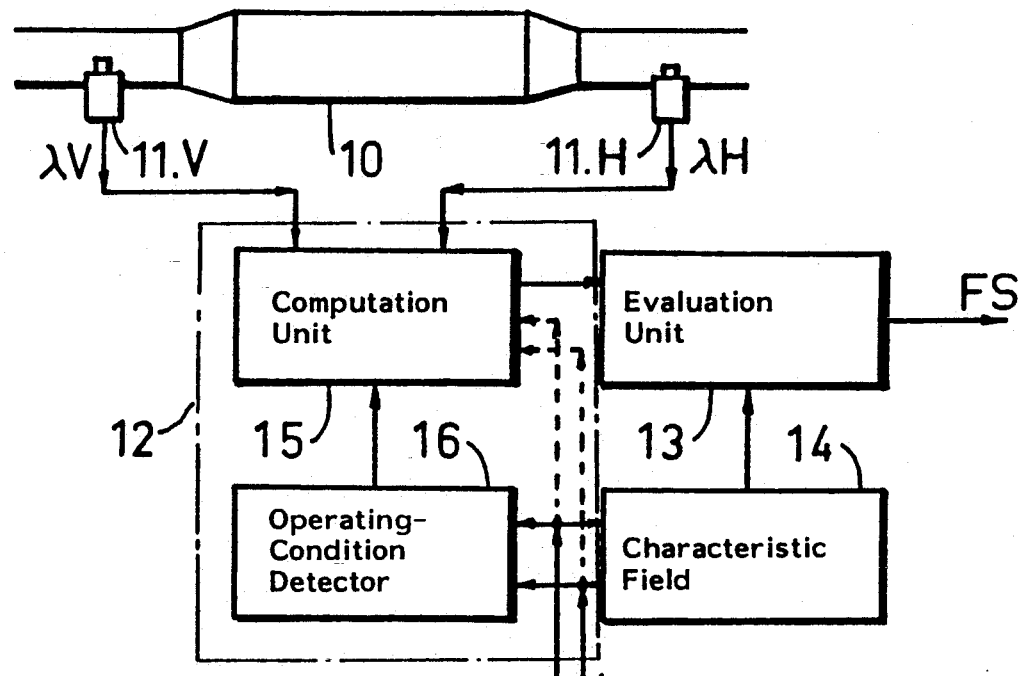
FIG. 1 is a schematic representation of a catalytic converter having probes arranged forward and rearward thereof, respectively, connected to an arrangement for evaluating whether the catalytic converter can still be used.

FIG. 1 shows a catalytic converter 10 having an oxygen probe 11.V arranged forward of the converter and an oxygen probe 11.H arranged rearward of the converter, a value-determining unit 12, an evaluation unit 13 and a characteristic field 14. The value-determining unit 12 includes a computation device 15 and an operating-state detector 16.

The computation unit 15 receives a forward-probe signal $\lambda V$ from the forward probe 11.V and a rearward-probe signal $\lambda H$ from the rearward probe 11.H. From these signals, the computation unit 15 computes a value for evaluating the performance loss of the catalytic converter 10. The computation unit 15 performs this computation during steady-state operation of the engine (not shown) to which the catalytic converter is connected. The operating state is announced by detector 16 when the engine is operated in the steady state. The value determined by the computation unit 15 is compared to a characteristic-field value in the evaluation unit 13 with the characteristic-field value being supplied from the characteristic field 14. If the comparison shows that the catalytic converter 10 has a performance loss which is impermissibly high, then the evaluation unit 13 emits a fault signal FS.

Figure 3:
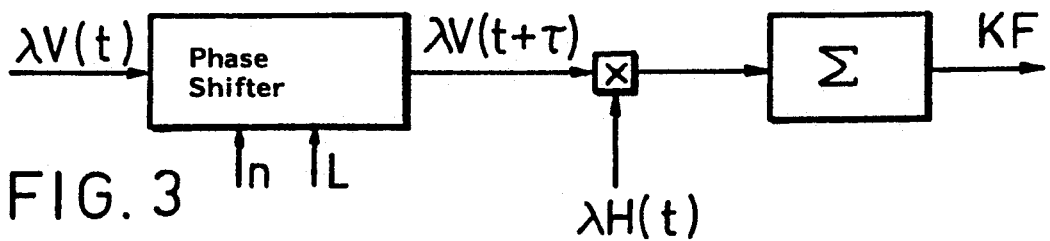
FIG. 3 is a block circuit diagram of a computation unit for computing a maximum cross-correlation factor KF.

Values of variables are supplied to the operating-state detector 16 and the characteristic field 14 and indicate the operating state of the internal combustion engine. In FIG. 1, such variables as engine speed (n) and a load signal L are shown. The current value for corresponding ones of these variables are also supplied to the computation unit 15 in the event that this unit is configured as shown in FIG. 3 or in FIG. 5.

In FIG. 2a, the signal $\lambda V(t)$ is measured by the forward probe 11.V and is shown for the case that lambda control takes place with an integrating controller. The signal fluctuates about the air ratio one. When the catalytic converter 10 converts optimally, it stores oxygen in lean phases and again supplies this oxygen during rich phases to toxic gas components which can be oxidized. In this way, the air number measured rearward of the catalytic converter is continuously essentially "1" for a new catalytic converter in the steady-state operation of the engine. However, when the catalytic converter becomes somewhat aged, the converter can no longer store the entire quantity of oxygen received during a lean phase, and accordingly, the converter can no longer oxidize the oxidizable toxic components over the entire duration of the following rich phase. This means that at the end of a particular phase, a value deviating from the value "1" is measured as shown in FIG. 2b. A phase shift $\tau$ is present between the signal $\lambda V(t)$ of the forward probe and the signal $\lambda H(t)$ of the rearward probe. This phase shift $\tau$ is essentially dependent upon the running time of the exhaust gas from the forward probe 11.V to the rearward probe 11.H. This phase shift $\tau$ can either be measured or can be determined from the above-mentioned operating-state variables, for example, with the aid of a characteristic field. When the performance loss of the catalytic converter becomes greater, the portions of the lean phase and the rich phase wherein the rearward-probe signal $\lambda H(t)$ shows deviations from the value "1" become longer. An example is shown in FIG. 2c. The same operating state of the engine is assumed for each of FIGS. 2b and 2c and for this reason, the phase shift $\tau$ is essentially the same in both cases. The phase shift $\tau$ is hardly dependent upon converter performance loss.

Figure 2:
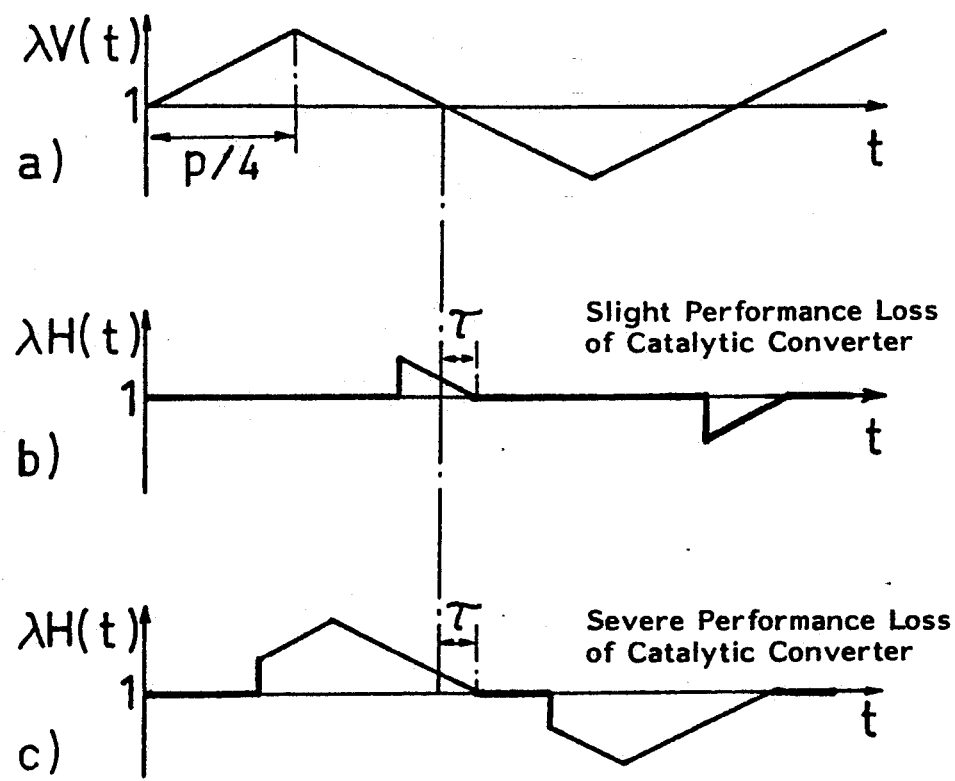

In viewing FIG. 2, it is directly apparent that the surface between the line for the air-ratio value "1" and the signal line of the rearward-probe signal $\lambda H(t)$ is a measure for the performance loss of the catalytic converter. However, it has been shown that the simple evaluation of this signal leads to very disturbance-susceptible values for evaluating the state of the performance loss of the converter. It is more advantageous to form the correlation between the forward-probe signal and the rearward-probe signal and to sum the individual products, that is, to correlate the two signals with each other.

The simplest correlation between two signals is the cross correlation. The largest value for the sum of the individual products, that is, the largest value for the so-called correlation factor KF is then obtained when the forward-probe signal $\lambda V(t)$ is shifted rearwardly by the phase shift $\tau$ between the forward-probe signal and the rearward-probe signal $\lambda H(t)$. This computation is undertaken by the computation unit according to FIG. 3. The computation unit has a phase shifter 17.1 for shifting the forward-probe signal by the phase $\tau$, a multiplication position 18.1 for multiplying the phase-shifted signal $\lambda V(t+\tau)$ with the rearward lambda-probe signal $\lambda H(t)$ and a summation position 19 for summing all individual products. Here, it is assumed that the computation unit 15 operates digitally. If the computation unit 15 is configured so as to be analog, then an integration position is present in lieu of a summation position 19.

In addition to cross correlation, the orthogonal correlation is an often-used method for evaluating a signal-influencing path. For the orthogonal correlation, the input signal and the output signal of the path (the signal of the forward probe and the signal of the rearward probe) are directly multiplied with each other in order to obtain a real component RE after averaging and, on the other hand, the input signal shifted by a quarter period is multiplied by the output signal whereby, after averaging, an imaginary component is obtained. The amplitude AMP and the phase $\rho$ of the output signal can then be computed from the real and imaginary components. In the present case, all four signals, that is the real component RE, the imaginary component IM, the amplitude AMP and the phase $\rho$ can each be used individually for evaluating the state of the performance loss of the converter. The amplitude AMP and the phase $\rho$ are more reliable than only the real component RE or the imaginary component IM since an improvement of the signal/noise ratio accompanies the combination of real and imaginary components. Real and imaginary components can also be combined in another way than for amplitude formation or phase formation, for example, by summation, multiplication or division. In all cases, threshold values are applied on a measuring stand which supply that value for the particular selected evaluation variable starting at which a catalytic converter is no longer useable. These values are stored in the characteristic field 14.

Figure 4:
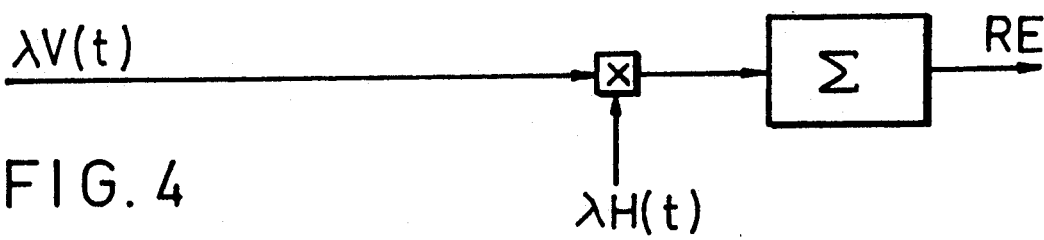
FIG. 4 is a block circuit diagram of a computation unit for computing a variable RE which corresponds to the real component for an orthogonal correlation.

The computation of the real component RE is shown in FIG. 4. The computation unit applicable has a multiplier position 18.2 and a summation position 19. The functions of these units proceed directly from the legends of FIG. 4.

Figure 5:
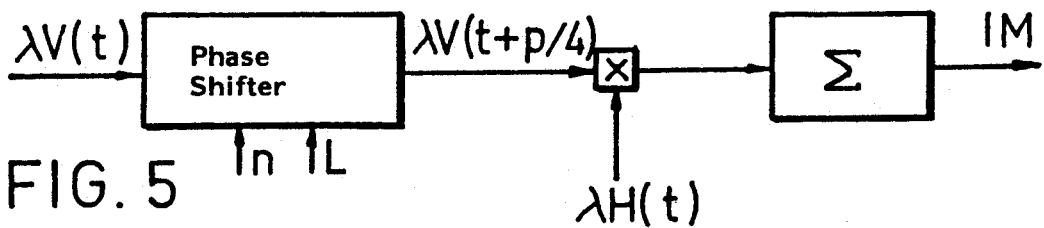
FIG. 5 is a block circuit diagram of a computation unit for computing a variable IM which corresponds to the imaginary component for orthogonal correlation.

The computation unit of FIG. 5 operates to compute the imaginary component IM. The computation unit includes a phase shifter 17.2, a multiplier position 18.3 and a summation position 19. In this case too, the functions of the above-mentioned units are apparent from the legends in the figure. It is noted that the phase shifter 17.2 must not necessarily determine the period duration (p) of the forward-probe signal $\lambda V(t)$ over the particular current values of the operating state variables (n) and L; instead, the period duration can be measured directly.

Figure 6:
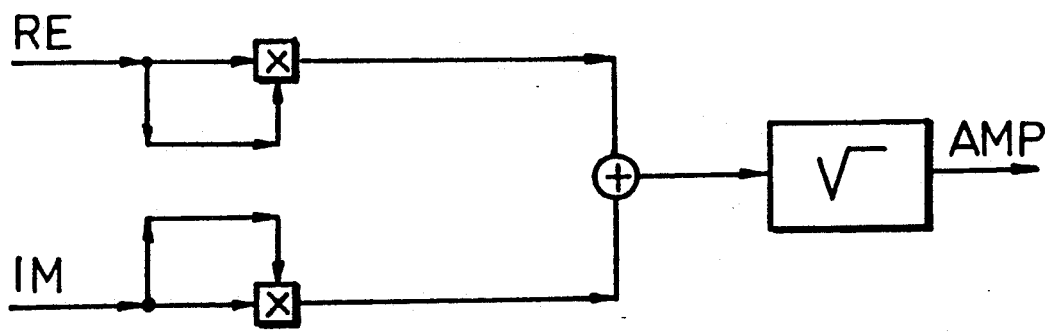
FIG. 6 is a block circuit diagram for a computation unit for computing an amplitude value AMP from a real component RE and an imaginary component IM.

The computation unit of FIG. 6 for determining the amplitude AMP is predicated upon the computation units of FIGS. 4 and 5 which supply the real and imaginary components. This computation unit includes a multiplier position 18.4 for forming the square of the real component, a multiplier position 18.5 for forming the square of the imaginary component, a summation position 19 for summing the two squares and a root-forming position 20 which supplies the current amplitude value. The root-forming position 20 can also be omitted.

Figure 7:
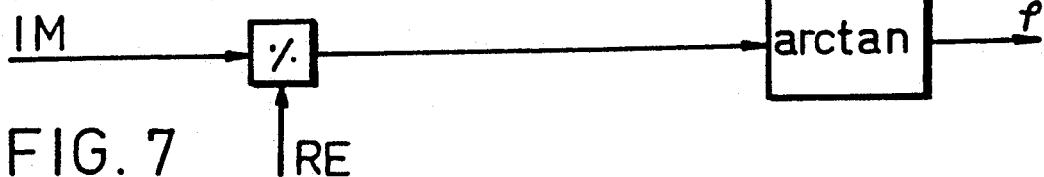
FIG. 7 is a block circuit diagram of a computation unit for computing a phase shift value $p$ from the real component RE and the imaginary component IM; and, FIG. 8 is a flowchart for explaining a method which can be carried out with the arrangement of FIG. 1 for obtaining a value for evaluating the performance loss of a catalytic converter.

FIG. 7 shows a computation unit for computing the phase shift $\rho$. This unit is also predicated upon the computation units of FIGS. 4 and 5 for the real and the imaginary components. The arrangement has a division position 21 for dividing the imaginary component IM by the real component RE and a trigonometric position 22 for computing the arc tangent of the mentioned quotient as the phase $\rho$.

Figure 8:
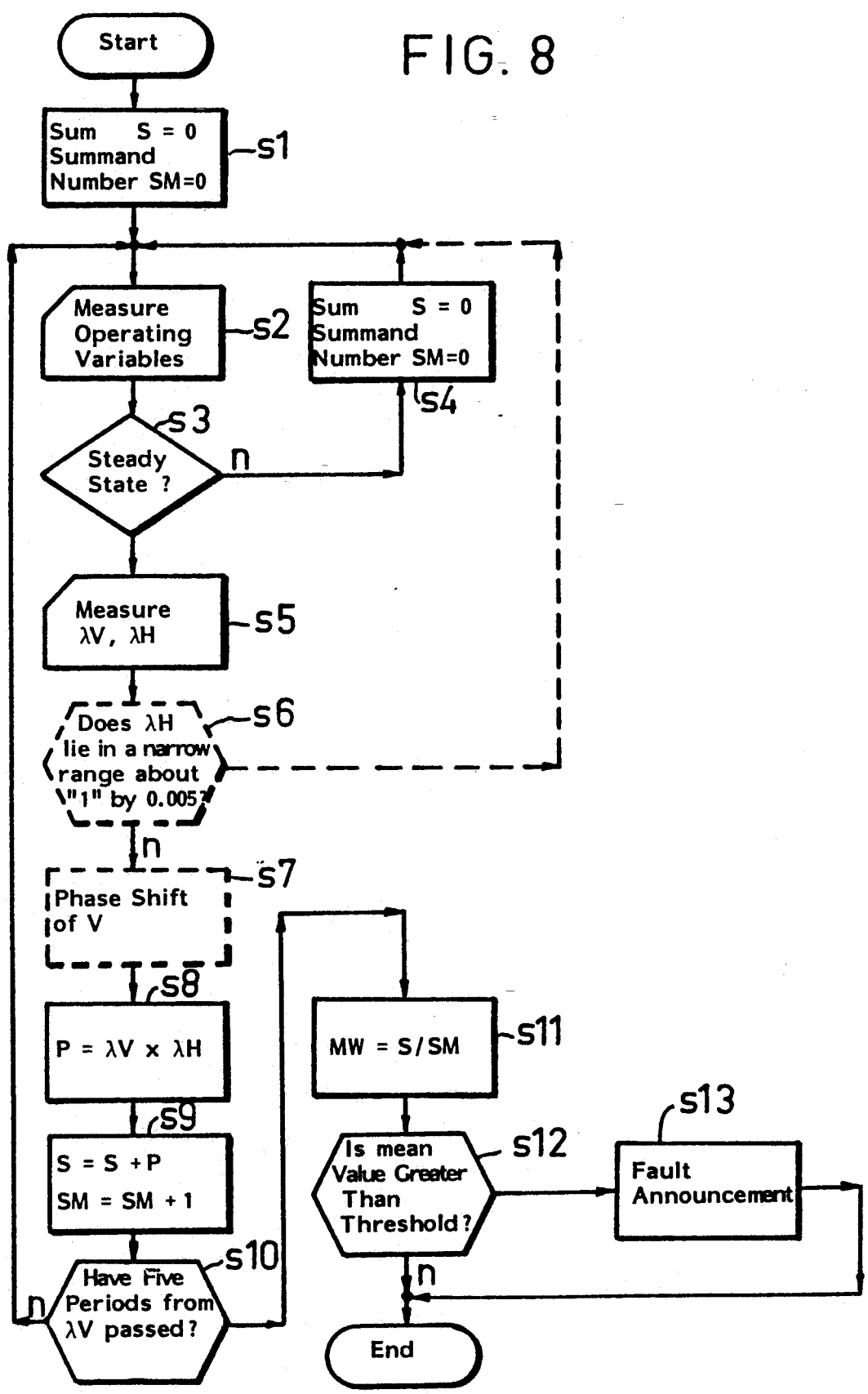

FIG. 8 shows a method for obtaining an evaluation value for the performance loss of a catalytic converter with the aid of the arrangement shown in FIG. 1. After the start of the method (step s1), a sum value S and a number SM for the number of sums are set to zero. Then, a loop is entered, wherein (step s2) the operating state of the internal combustion engine is determined. Then a check is made (step s3) as to whether the engine is running in steady state. If this is not the case the values S and SM are again set to zero in a step s4. These values do not yet deviate from zero with respect to the sequence described up to now, however, this can be the case when the loop discussed above has already been run through in a steady-state operating state of the engine. If this steady-state operating state is then taken leave of before the total value determination is completed, all values are reset since it is improbable that after leaving the current steady-state condition, the same steady-state condition would again be reached. Only in this exceptional case would the variables determined previously be useable further.

If it develops in step s3 that the engine runs in steady state for the first time or in steady state as previously, then the forward-probe signal $\lambda V$ and the rearward-probe signal $\lambda H$ are measured (step s5). A step s6 then follows which does not necessarily have to be carried out and, for this reason, this step is shown only in phantom outline. In step s6, a check is made as to whether the value $\lambda H$ lies about the value "1" in a narrow range. If this is the case, then there is a return to step s2 without a further computation taking place. The computation results obtained until then however are retained. This step s6 is carried out when it is desired that the forward- and rearward-probe signals are only to be correlated when the rearward-probe signal deviates from the value "1".

The next step s7 is also optional. Here, a shift of the phase of the forward-probe signal $\lambda V$ takes place. As explained below, a shift of this kind is only necessary when the cross-correlation factor KF or the imaginary component IM are computed. The extent of the phase shift is possible with the aid of the operating values measured in step s2 and a characteristic field.

In a step s8, the forward-probe signal $\lambda V$ (perhaps phase shifted) and the rearward-probe signal $\lambda H$ are multiplied with each other to a product P. With this product, the product summation S is made current and the addend register SM is incremented (step s9). Finally, at the end (step s10) of the above-mentioned loop it is checked to determine if five periods of the forward-probe signal $\lambda V$ have run. If this is not the case, the loop runs again starting with step s2. Otherwise, the mean value MW of the determined product P is determined in that (step s11) the sum S is divided by the count value of the addend register. The evaluation value determined in this manner is compared in a step s12 to a threshold value read out of a characteristic field 14. Here, by using the cross-correlation factor KF or the amplitude AMP, a check is made as to whether the evaluation value exceeds the threshold. By using the other above-mentioned correlation values, the comparison relationship between the evaluation value and the threshold value can also be different. If it develops in step s12 that the pregiven variable relationship for a still useable catalytic converter between the evaluation value and the characteristic field value is not satisfied, a fault announcement (step s13) is emitted which indicates that the catalytic converter should be replaced. This fault can, for example, be read into a fault memory and a warning lamp can be lit. After the fault announcement in step s13 is made or directly after step s12, and when no fault is present, the method is ended. Preferably, the step is carried out only once per operational cycle of the engine. The start of an operational cycle is then present when the engine is started at an engine temperature below 50° C.

It is here noted that the mean value formation of step s11 can be omitted. Then, the sum formed in step s9 is directly compared to a threshold value. However, this has the disadvantage that the characteristic field storing the threshold values must store greater values and therefore requires greater storage capacity.

In the method described above, a check is made in step s10 as to whether five periods of the forward-probe signal have passed. However, the period number can also be differently selected and especially larger in order to increase the reliability of the method. The number of periods selected is greatly dependent upon the type of motor vehicle and the type of engine. It must be ensured that a steady-state operation of such duration occurs with great probability for each operational cycle so that the entire computation can be completed.

It is understood that the foregoing description is that of the preferred embodiments of the invention and that various changes and modifications may be made thereto without departing from the spirit and scope of the invention as defined in the appended claims.

What is claimed is:

1. A method of obtaining a value for evaluating the performance loss of a catalytic converter with the aid of a forward signal of a forward gas probe mounted forward of the catalytic converter and a rearward signal of a rearward gas probe mounted rearward of the catalytic converter, the catalytic converter being connected to an internal combustion engine, the method comprising the steps of:

carrying out the method during the steady-state operation of the engine;

multiplying said forward signal and said rearward signal with each other to form a plurality of products;

averaging said products over a plurality of oscillations of said forward signal to obtain a mean value; and, utilizing said mean value as a value for evaluating the performance loss of the catalytic converter.

2. The method of claim 1, wherein: the current values ($\lambda V(t)$, $\lambda H(t)$) of said forward and rearward signals are multiplied by each other; then the products formed are averaged thereby obtaining a real component (RE); and, said real component (RE) is utilized as a value for evaluating the performance loss of the catalytic converter.

3. The method of claim 2, wherein: values ($\lambda(t+p/4)$) of said forward signal are multiplied by current values ($\lambda H(t)$) of said rearward signal, said values ($\lambda(t+p/4)$) being shifted rearwardly by a quarter of the oscillation period (p) of said forward signal; and, said averaging takes place to obtain an imaginary component (IM) which can be used as said evaluation value.

4. The method of claim 3, wherein: said multiplication and said averaging are only carried out in such time spans in which the rearward signal ($\lambda H(t)$) deviates from the air ratio "1".

5. The method of claim 4, wherein: an amplitude (AMP) is computed as $(RE^2+IM^2)^{\frac{1}{2}}$ from said real component (RE) and said imaginary component (IM); and, said amplitude is used as an evaluation value.

6. The method of claim 5, wherein: a phase ($p$) is computed as arctan (IM/RE) from said real component (RE) and said imaginary component (IM): and, said phase ($p$) is used as an evaluation value.

7. The method of claim 1, wherein: said forward signal ($\lambda V(t+\tau)$) is shifted rearwardly by the phase shift ($\tau$) between said forward and rearward signals; said forward signal ($\lambda V(t+\tau)$) is multiplied by said rearward signal ($\lambda H(t)$) and then said averaging takes place to obtain a cross-correlation factor (KF) which is used as an evaluation value.

8. The method of claim 1, wherein: said evaluation value is compared to a characteristic field value corresponding to the particular steady-state operating state; said catalytic converter being deemed to have impermissibly great performance loss when a pregiven variable relationship between said evaluation value and said characteristic field value is not satisfied.

9. An arrangement for obtaining a value for evaluating the performance loss of a catalytic converter connected to an internal combustion engine, the arrangement comprising:

a forward gas probe forward of the catalytic converter for emitting a forward signal;

a rearward gas probe rearward of the catalytic converter for emitting a rearward signal;

detection means for determining whether the engine is running in a steady-state operating condition;

computation means for computing the evaluation value from said forward and rearward signals when the engine is in said steady-state operating condition and for emitting an evaluation value; and, said computation means including means for multiplying said forward and rearward signals with each other to form a plurality of products; and, means for averaging said products over a plurality of oscillations of said forward signal.

10. The arrangement of claim 9, further comprising:

characteristic field means for storing extreme values for the evaluation variable in dependence upon operating values of the engine; and, an evaluation unit for comparing said evaluation value emitted by said computation means to a characteristic field value read out of said characteristic field means; and, said evaluation means including means for evaluating the catalytic converter as having an impermissibly great performance loss when a pregiven variable relationship between said evaluation value and said characteristic field value is not satisfied.

* * * * *